United States Patent
Fukushima

(10) Patent No.: US 12,441,258 B2
(45) Date of Patent: Oct. 14, 2025

(54) WIRING MEMBER-EQUIPPED ADHEREND AND COVER-EQUIPPED WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventor: Daichi Fukushima, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 65 days.

(21) Appl. No.: 18/280,494

(22) PCT Filed: Mar. 17, 2022

(86) PCT No.: PCT/JP2022/012471
§ 371 (c)(1),
(2) Date: Sep. 6, 2023

(87) PCT Pub. No.: WO2022/202639
PCT Pub. Date: Sep. 29, 2022

(65) Prior Publication Data
US 2024/0140332 A1    May 2, 2024

(30) Foreign Application Priority Data
Mar. 23, 2021  (JP) ................. 2021-049040

(51) Int. Cl.
*B60R 16/02* (2006.01)
*H01B 7/08* (2006.01)
*H01B 7/40* (2006.01)

(52) U.S. Cl.
CPC ....... *B60R 16/0215* (2013.01); *H01B 7/0846* (2013.01); *H01B 7/40* (2013.01)

(58) Field of Classification Search
CPC ... B60R 6/0215; B60R 6/0207; H01B 7/0045; H01B 7/40; H01B 7/08; H01B 7/0846; H02G 3/04; H02G 3/30
See application file for complete search history.

(56) References Cited

U.S. PATENT DOCUMENTS

| | | | | |
|---|---|---|---|---|
| 2002/0017366 | A1* | 2/2002 | Inagaki | H05K 3/281 |
| | | | | 156/580.2 |
| 2006/0086016 | A1* | 4/2006 | Cornell | B60R 13/0861 |
| | | | | 40/209 |

(Continued)

FOREIGN PATENT DOCUMENTS

| | | | | |
|---|---|---|---|---|
| JP | S61147718 A | * 12/1984 | | H02G 3/04 |
| JP | 2016-154430 | 8/2016 | | |

(Continued)

OTHER PUBLICATIONS

Japan Office Action issued in Japan Patent Application No. 2021-049040, dated Sep. 3, 2024, together with an English translation thereof.

(Continued)

*Primary Examiner* — Paresh Paghadal
(74) *Attorney, Agent, or Firm* — Greenblum & Bernstein, P.L.C.

(57) ABSTRACT

A wiring member-equipped adherend includes: a wiring member including a sheet and a wire-like transmission member fixed to the sheet; an adherend provided in a position where the wiring member is disposed in a vehicle and fixed to the sheet via a first fixing member; and a cover covering the wire-like transmission member from a side opposite to the sheet. The cover is fixed to the adherend via (Continued)

a second fixing member on at least one side of the wiring member.

8 Claims, 5 Drawing Sheets

(56) References Cited

U.S. PATENT DOCUMENTS

| | | | | |
|---|---|---|---|---|
| 2017/0327060 | A1* | 11/2017 | Nakajima | H01B 13/01254 |
| 2018/0005726 | A1 | 1/2018 | Hiramitsu et al. | |
| 2020/0091689 | A1* | 3/2020 | Kisu | B60R 16/0215 |
| 2021/0020331 | A1* | 1/2021 | Mizuno | H01B 7/1875 |
| 2021/0309169 | A1* | 10/2021 | Kisu | B60R 16/0215 |
| 2022/0028577 | A1 | 1/2022 | Nakano et al. | |
| 2022/0139594 | A1* | 5/2022 | Nakano | H01B 7/0823 |
| | | | | 174/117 F |
| 2022/0407296 | A1* | 12/2022 | Mizushita | B60R 16/0215 |
| 2023/0119133 | A1* | 4/2023 | Mizushita | H02G 3/32 |
| | | | | 174/110 R |
| 2023/0162887 | A1* | 5/2023 | Mizushita | H01B 7/40 |
| | | | | 174/68.1 |
| 2024/0274318 | A1* | 8/2024 | Aramaki | H01B 7/40 |
| 2024/0275146 | A1* | 8/2024 | Aramaki | H02G 3/04 |
| 2024/0282482 | A1* | 8/2024 | Fukushima | H01B 3/50 |
| 2025/0062054 | A1* | 2/2025 | Fukushima | G02B 6/4432 |

FOREIGN PATENT DOCUMENTS

| | | | | |
|---|---|---|---|---|
| JP | 6579297 | B1 * | 9/2019 | H01B 7/0823 |
| JP | 2020-198772 | | 12/2020 | |
| WO | 2019/189177 | | 10/2019 | |
| WO | 2020/059694 | | 3/2020 | |

OTHER PUBLICATIONS

International Search Report issued International Patent Application No. PCT/JP2022/012471, dated May 31, 2022, along with an English translation thereof.

International Preliminary Report on Patentability issued International Patent Application No. PCT/JP2022/012471, dated Oct. 5, 2023, along with an English translation thereof.

* cited by examiner

WIRING MEMBER-EQUIPPED ADHEREND AND COVER-EQUIPPED WIRING MEMBER

TECHNICAL FIELD

The present disclosure relates to a wiring member-equipped adherend and a cover-equipped wiring member.

BACKGROUND ART

Patent Document 1 discloses a wire harness in which an electrical wire and a cover are fixed to a sheet material.

PRIOR ART DOCUMENTS

Patent Document(s)

Patent Document 1: International Publication No. 2019/189177

SUMMARY

Problem to be Solved by the Invention

In providing a cover covering a wiring member including a wire-like transmission member and a sheet, a size of the sheet is desired to be reduced while suppressing reduction of fixation strength of the cover.

Accordingly, an object is to provide a technique capable of reducing a size of a sheet while suppressing reduction of fixation strength of a cover.

Means to Solve the Problem

A wiring member-equipped adherend according to the present disclosure includes: a wiring member including a sheet and a wire-like transmission member fixed to the sheet; an adherend provided in a position where the wiring member is disposed in a vehicle and fixed to the sheet via a first fixing member; and a cover covering the wire-like transmission member from a side opposite to the sheet, wherein the cover is fixed to the adherend via a second fixing member on at least one side of the wiring member.

Effects of the Invention

According to the present disclosure, a size of a sheet can be reduced while suppressing reduction of fixation strength of a cover.

DESCRIPTION OF EMBODIMENT(S)

Description of Embodiment of Present Disclosure

Figure 1:
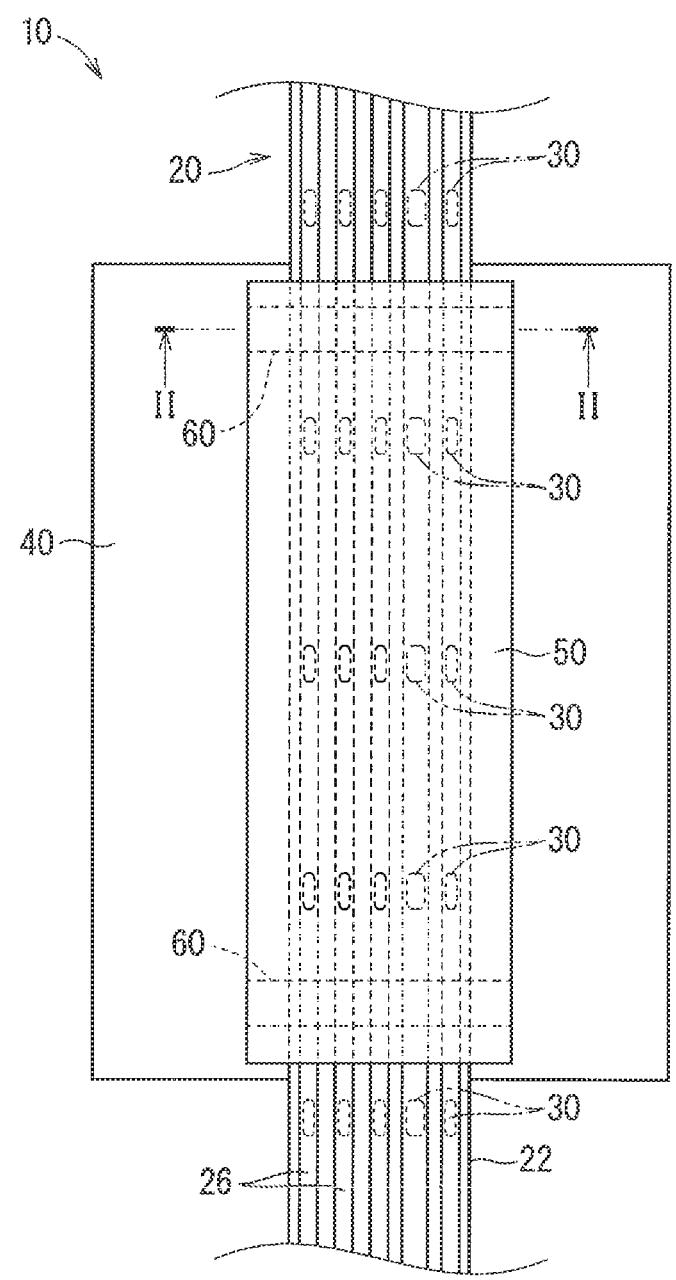
FIG. 1 is a plan view illustrating a wiring member-equipped adherend according to an embodiment 1.

Embodiments of the present disclosure are listed and described firstly.

A wiring member-equipped adherend according to the present disclosure is as follows.

(1) A wiring member-equipped adherend includes: a wiring member including a sheet and a wire-like transmission member fixed to the sheet; an adherend provided in a position where the wiring member is disposed in a vehicle and fixed to the sheet via a first fixing member; and a cover covering the wire-like transmission member from a side opposite to the sheet, wherein the cover is fixed to the adherend via a second fixing member on at least one side of the wiring member. The cover is fixed to the adherend, thus fixation strength required in the cover can be easily ensured, and a region for fixing the cover can be omitted or reduced in a sheet. Accordingly, a size of the sheet can be reduced while suppressing reduction of fixation strength of the cover.

(2) In the wiring member-equipped adherend according to (1), a dimension of a region where the cover and the adherend are fixed via the second fixing member may be larger than a dimension of a region of a side edge portion of the sheet where the wire-like transmission member is not disposed in a width direction of the sheet. Accordingly, the region in the cover having the larger dimension than the side edge portion of the sheet is fixed to the adherend.

(3) In the wiring member-equipped adherend according to (1) or (2), the cover may be fixed in a taut state along the width direction of the sheet while having contact with the wire-like transmission member. Accordingly, the cover can press the wiring member toward the adherend.

(4) In the wiring member-equipped adherend according to any one of (1) to (3), it is applicable that the cover and the sheet are different members, and the cover is fixed to the adherend on both sides of the wiring member. Accordingly, a member having physical properties different from that of the sheet can be easily adopted as the cover.

(5) In the wiring member-equipped adherend according to any one of (1) to (3), it is applicable that the cover is formed by folding back a part of a base material constituting the sheet, and the cover is fixed to the adherend on only one side of the wiring member. Accordingly, the cover and the adherend need not be fixed on one side, thus an operation of fixing the cover and the adherend can be easily performed.

(6) In the wiring member-equipped adherend according to any one of (1) to (5), both the first fixing member and the second fixing member may be adhesive members. Accordingly, the wiring member, the adherend, and the cover can be simply fixed via the adhesive member.

(7) In the wiring member-equipped adherend according to (6), the cover may include a sheet bonding part as a part overlapped with the side edge portion of the sheet and bonded to the side edge portion of the sheet and an adherend bonding part as a part protruding from the sheet bonding part to an outer side of the side edge portion of the sheet along the width direction of the sheet and bonded to the adherend via the adhesive member. Accordingly, the cover can be fixed to both the adherend and the sheet.

(8) A cover-equipped wiring member according to the present disclosure includes: a wiring member including a sheet and a wire-like transmission member fixed to the sheet; and a cover covering the wiring member, wherein the cover includes a sheet bonding part as a part overlapped with a side edge portion of the sheet on at least one side of the wiring member and bonded to the side edge portion of the sheet via an adhesive member and a protrusion part protruding from the sheet bonding part to an outer side of the side edge portion of the sheet along a width direction of the sheet. The sheet bonding part is provided, thus the cover can be temporarily held by the wiring member. The protrusion part is provided, thus the protrusion part and the adherend can be fixed to each other. The sheet bonding part in the cover is fixed to the sheet, and moreover, the protrusion part is fixed to the adherend, thus the size of the sheet can be reduced while suppressing reduction of fixation strength of the cover.

Detailed Description of Embodiment of Present Disclosure

Specific examples of a wiring member-equipped adherend according to the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
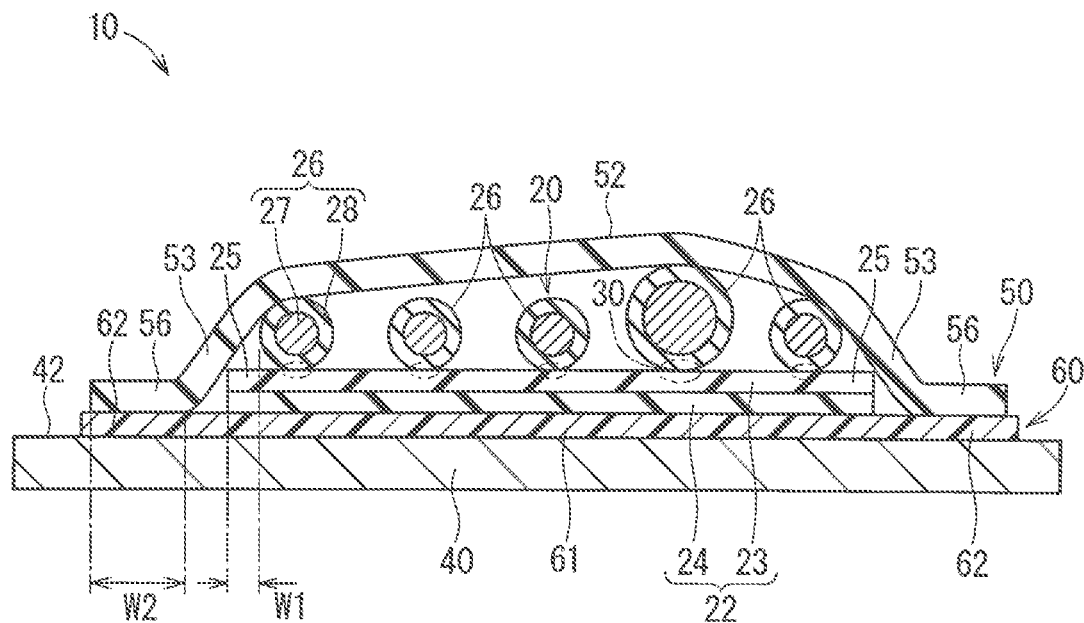
FIG. 2 is a cross-sectional view along a II-II line in FIG. 1.
Figure 3:
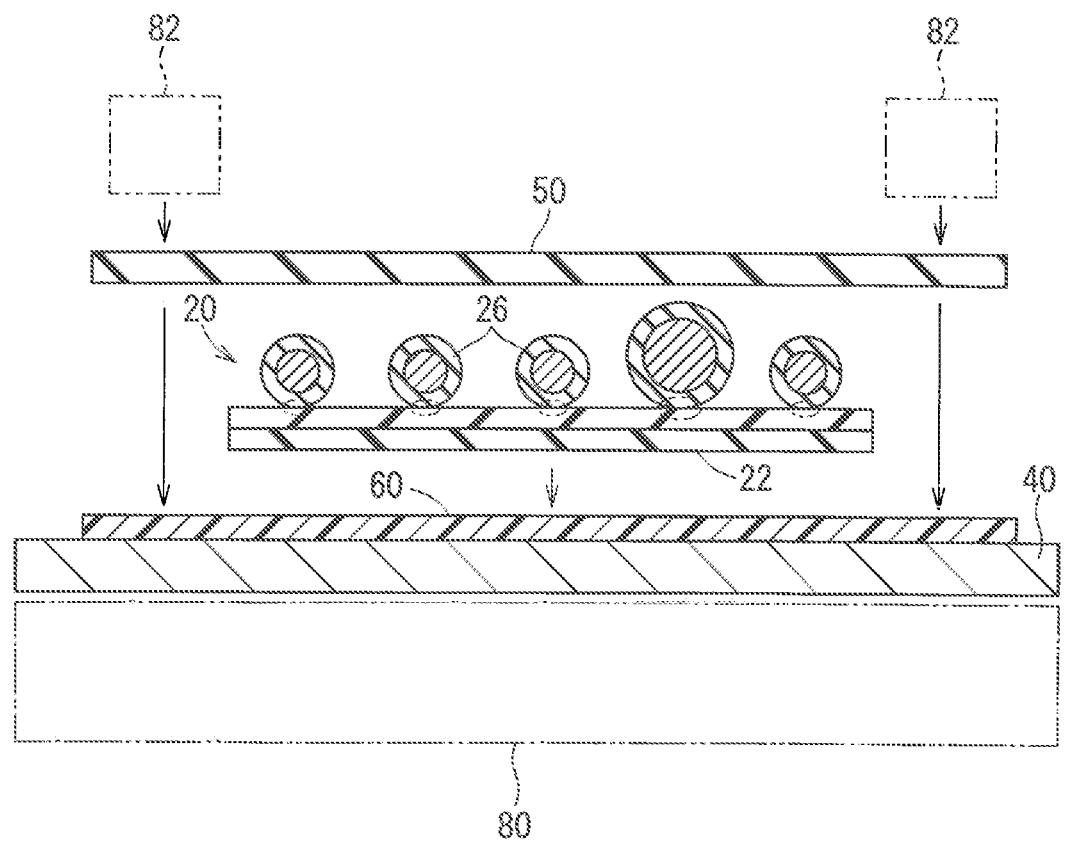
FIG. 3 is an explanation diagram illustrating manufacture of the wiring member-equipped adherend.

A wiring member-equipped adherend according to an embodiment 1 is described hereinafter. FIG. 1 is a plan view illustrating a wiring member-equipped adherend 10 according to the embodiment 1. FIG. 2 is a cross-sectional view along a II-II line in FIG. 1. FIG. 3 is an explanation diagram illustrating manufacture of the wiring member-equipped adherend 10.

The wiring member-equipped adherend 10 includes a wiring member 20, an adherend 40, and the cover 50. The wiring member 20 and the cover 50 are fixed to the adherend 40. The wiring member 20 is fixed to the adherend 40 via a first fixing member. The cover 50 is fixed to the adherend 40 via a second fixing member. In the present example, both the first fixing member and the second fixing member are adhesive members 60. The cover 50 is fixed to the adherend 40 on at least one side of the wiring member 20. In the present example, the cover 50 and the sheet 22 are different members, and the cover 50 is fixed to the adherend 40 on both sides of the wiring member 20.

The wiring member 20 includes a sheet 22 and a wire-like transmission member 26. The wire-like transmission member 26 is fixed to the sheet 22. The plurality of wire-like transmission members 26 are arranged on a first surface of the sheet 22. Each of the plurality of wire-like transmission members 26 is fixed to the sheet 22. The plurality of wire-like transmission members 26 are held to be arranged on the first surface of the sheet 22. Accordingly, the wiring member 20 is flattened by reducing a dimension in a height direction in relation to dimensions in a width direction and a length direction.

It is sufficient that the sheet 22 can fix the wire-like transmission member 26, thus a material and a structure, for example, are not particularly limited. With regard to a material constituting the sheet 22, the sheet 22 is formed of a resin material herein. A material other than resin such as metal or an inorganic material, for example, may be used for the material constituting the sheet 22. With regard to the structure of the sheet 22, the sheet 22 has a double layer structure herein. The structure of the sheet 22 may be a single layer structure, or a multilayer structure of three or more layers is also applicable.

The sheet 22 includes a first layer 23 and a second layer 24. The first layer 23 is the fusion layer 23. The wire-like transmission member 26 is fused and fixed to the fusion layer 23. The fusion layer 23 includes a resin material, or preferably includes a thermoplastic resin material. The resin material of the fusion layer 23 is softened and fused to a fusion target. A type of the resin material is not particularly limited, but polyvinyl chloride (PVC), polyethylene (PE), polypropylene (PP), or polyethylene terephthalate (PET) can be adopted, for example.

A structure of the fusion layer 23 is not particularly limited. For example, the fusion layer 23 may be a sheet having an evenly filled cross-sectional surface (also referred to as a non-foam sheet or a solid sheet, for example). The fusion layer 23 is also considered a foam sheet, for example. The fusion layer 23 is also considered a fibrous material sheet such as a braided cloth, a woven cloth, or a non-woven cloth, for example. One surface of the first layer 23 is a first surface of the sheet 22.

The second layer 24 is formed of a material different from that of the fusion layer 23, or has a different structure. The second layer 24 increases a function of the fusion layer 23, or adds a function which the fusion layer 23 does not have to the sheet 22. A material constituting the second layer 24 is a material described for the fusion layer 23 described above, metal, or an inorganic material, for example. A structure of the second layer 24 may be any of the structure described for the fusion layer 23 described above. One surface of the second layer 24 is a second surface of the sheet 22.

The first layer 23 and the second layer 24 are fixed to each other while the other surface of the first layer 23 and the other surface of the second layer 24 have contact with each other. A fixing state of the first layer 23 and the second layer 24 is not particularly limited, however, fixing by fusion or adhesion is preferable. For example, when at least one of the first layer 23 and the second layer 24 is a sheet having voids in a surface such as a fibrous material sheet or a foam sheet, a resin material or an adhesive agent enters the voids and the layers can be fixed to each other. Such a configuration causes so-called anchor effect, thus the first layer 23 and the second layer 24 are rigidly fixed.

In the description herein, the first layer 23 is a solid sheet made of resin and the second layer 24 is a fibrous material sheet. In the description herein, the first layer 23 and the second layer 24 are fused to each other. That is to say, the resin of the first layer 23 enters between the fibers of the second layer 24 while having flowability, and is then hardened. Maintained accordingly is a state where the resin of the first layer 23 enters between the fibers of the second layer 24, and the first layer 23 and the second layer 24 are rigidly fixed to each other.

The first layer 23 and the second layer 24 are formed to have the same size (the same planar shape). One of the first layer 23 and the second layer 24 may also be formed to be larger than the other one thereof. The first layer 23 and the second layer 24 are wholly fixed at a region where they have contact with each other. The first layer 23 and the second layer 24 may also be fixed only at a part of a region where they have contact with each other.

The sheet 22 may be a flexible member. For example, the first layer 23 is a solid sheet made up of flexible resin such as flexible PVC as a material, the second layer 24 is a non-woven cloth made up of PET as a material, and the sheet 22 is a flexible member. For example, the sheet 22 may have flexibility so as to be able to follow bending of the wire-like transmission member 26. It is also applicable that the wiring member 20 can be bended in a thickness direction (bending so that a fold line follows the main surface of the sheet 22).

The wire-like transmission member 26 is a wire-like member transmitting electrical power or light, for example. One or a plurality of wire-like transmission members 26 are provided. The wire-like transmission member 26 is assumed to be a member connecting components in a vehicle. A connector, for example, is provided to an end portion of the wire-like transmission member 26. This connector is connected to a connector provided to the other side component, thus the wire-like transmission member 26 is connected to the other side component. That is to say, the wiring member 20 is used as the wiring member 20 electrically connecting various types of component in a vehicle, for example (or connecting them so that they can perform optical communication). The connector may be fixed to the sheet 22. The connector may be provided to an outer side of the sheet 22.

A route of the wire-like transmission members 26 is set in accordance with a position of a component to which the wire-like transmission member 26 is connected, for example. The wire-like transmission members 26 are fixed to the sheet 22, thus the wire-like transmission members 26 are kept in a form following a wiring route corresponding to a position of a component as a connection destination of each wire-like transmission member 26. Herein, the wire-like transmission members 26 extend straight on the sheet 22. The sheet 22 is formed into a shape in accordance with a route of the wire-like transmission member 26 (straight shape, herein). However, the route of the wire-like transmission members 26 may be made up of a combination of a straight route and a bending route. The sheet 22 may also be made up of a combination of a straight route and a bending route. The plurality of wire-like transmission members 26 may be fixed to the sheet 22 in a state where a branch wire is branched from a main wire. The sheet 22 may also be formed into a shape in which a portion to which the branch wire is fixed is branched from a portion to which the main wire is fixed.

The wire-like transmission member 26 includes a transmission wire body 27 and a covering layer 28. The transmission wire body 27 is a transmission route transmitting electrical power or light. For example, when the wire-like transmission member 26 is an electrical wire, the transmission wire body 27 is a conductor core wire. The conductor core wire is made up of one or a plurality of strands. The strand is formed of copper, copper alloy, aluminum, or aluminum alloy as a material, for example. For example, when the wire-like transmission member 26 is an optical fiber, the transmission wire body 27 is a core and a clad. The covering layer 28 is a layer covering the transmission wire body 27. A resin material constituting the covering layer 28 is not particularly limited, but can be appropriately set. For example, the wire-like transmission member 26 may be a general wire having a core wire and a covering layer around the core wire, or may also be a shield wire, a twisted wire, an enamel wire, a nichrome wire, or an optical fiber.

The wire-like transmission member 26 transmitting the electrical power may be various kinds of signal lines or various kinds of power lines. Some of the wire-like transmission members 26 transmitting the electrical power may be used as an antenna or coil, for example, transmitting or receiving a signal or electrical power to or from a space.

The wire-like transmission member 26 may be a single core wire. The single core wire is a single wire-like object. The single core wire is the wire-like transmission member with one transmission route. The wire-like transmission member 26 may be a multicore wire. The multicore wire is a compound body of a plurality of wire-like objects. The multicore wire is the wire-like transmission member 26 with a plurality of transmission routes. The multicore wire may be a cable made up of collected twisted wires or a plurality of wire-like objects covered by a sheath, for example.

The sheet 22 and the wire-like transmission member 26 are fixed to each other via a spot fixing part 30 partially fixed along an extension direction of the wire-like transmission member 26. The plurality of spot fixing parts 30 are provided at intervals along the extension direction of the wire-like transmission member 26. The interval between the spot fixing parts 30 is not particularly limited, but can be appropriately set. However, the fixing part between the sheet 22 and the wire-like transmission member 26 needs not be the spot fixing part 30. The fixing part between the sheet 22 and the wire-like transmission member 26 may be continuously provided to have a large length along the extension direction of the wire-like transmission member 26.

Any fixing state may be applied as a fixing state in the spot fixing part 30 between the sheet 22 and the wire-like transmission member 26. Applicable as the fixing state are a contact area fixation and a non-contact area fixation, or both fixations may be used together. Herein, the contact area fixation indicates that a portion where the sheet 22 and the wire-like transmission member 26 have contact with each other is stuck and fixed. The non-contact area fixation is a fixing state which is not the contact area fixation, and indicates that a sewing thread, a cover, or an adhesive tape presses the wire-like transmission member 26 toward the sheet 22 or sandwiches the sheet 22 and the wire-like transmission member 26 to keep them in a fixing state. In the description hereinafter, the sheet 22 and the wire-like transmission member 26 are in the state of the contact area fixation.

Applicable as the configuration of the contact area fixation are a contact area indirect fixation and a contact area direct fixation, or both fixations may also be used together in different regions. Herein, the contact area indirect fixation indicates that the sheet 22 and the wire-like transmission member 26 are indirectly stuck and fixed via an adhesive member such as an adhesive agent, a gluing agent, and a double-sided adhesive tape provided therebetween. The contact area direct fixation indicates that the sheet 22 and the wire-like transmission member 26 are directly stuck and fixed without an intervention of the adhesive agent, for example, which is separately provided. Considered in the contact area direct fixation is that resin included in at least one of the sheet 22 and the wire-like transmission member 26 is melted, thus the sheet 22 and the wire-like transmission member 26 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. Herein, in the spot fixing part 30 between the sheet 22 and the wire-like transmission member 26, the sheet 22 and the wire-like transmission member 26 are fused to each other. In this case, the fusion layer 23 of the sheet 22 and an outermost layer of the wire-like transmission member 26 are fused to each other. The outermost layer of the wire-like transmission member 26 is the covering layer 28. It is sufficient that a material of the covering layer 28 and a material of the fusion layer 23 have compatibility. Herein, a resin material constituting the covering layer 28 and a resin material constituting the fusion layer 23 are the same type of material. A resin material constituting the fusion layer 23 and a resin material constituting the covering layer 28 are PVC or polyolefin, for example.

The sheet 22 includes a side edge portion 25 where the wire-like transmission member 26 is not disposed. The wire-like transmission member 26 is disposed on a part of the sheet 22 other than the side edge portion 25 in a width direction of the sheet 22. The wire-like transmission member 26 is disposed closer to a center part of the sheet 22 in relation to the side edge portion 25 of the sheet 22 in the width direction of the sheet 22. Herein, a dimension of the side edge portion 25 along the width direction of the sheet 22 is smaller than a diameter of the wire-like transmission member 26. The dimension of the side edge portion 25 along the width direction of the sheet 22 may be equal to or larger than the diameter of the wire-like transmission member 26.

The adherend 40 is provided in a position where the wiring member 20 is disposed in a vehicle. A first end portion of the wiring member 20 extends to an outer side from a first end portion of the adherend 40. A second end portion of the wiring member 20 extends to an outer side from a second end portion of the adherend 40. One of or both the first end portion and the second portion of the wiring member 20 may be disposed on the adherend 40.

The adherend 40 is fixed to the sheet 22 of the wiring member 20 by the adhesive member 60. The second surface of the sheet 22 is fixed to an attached surface 42 of the adherend 40. Herein, the attached surface 42 is made of metal. The adherend 40 is a member including a metal member such as a single body of a metal member or a composite member of a metal member and a resin member, for example. A surface of this metal member serves as the attached surface 42. However, the attached surface 42 may be made of resin. In this case, the adherend 40 is a member including a resin member such as a single body of a resin member or a composite member of a metal member and a resin member, for example, and a surface of the resin member serves as the attached surface 42.

The adherend 40 may be a vehicle-mounted component and a member assembled to a vehicle together with the wiring member 20. The adherend 40 and the wiring member 20 may be transported to a vehicle assembly plant in a state of the wiring member-equipped adherend 10. The adherend 40 may be a bracket, for example. The adherend 40 may have the other function in addition to the function of fixing the wiring member 20 and the cover 50. Such a function may be a function of fixing an apparatus, for example. The adherend 40 may be provided with a fixing part fixed to a vehicle. When the adherend 40 and the vehicle are fixed by a screw, the fixing part provided to the adherend 40 is preferably a part used for screwing, and may be a through hole, a screw hole, a nut, or a stud bolt, for example.

The adherend 40 may be a member previously assembled to a vehicle before the wiring member 20 is assembled to the vehicle. The adherend 40 and the wiring member 20 may be transported to a vehicle assembly plant separately from each other. For example, the adherend 40 may be a body panel or a body frame.

The cover 50 covers the wire-like transmission member 26 from a side opposite to the sheet 22. The sheet 22 and the cover 50 surround the wire-like transmission members 26. The wire-like transmission member 26 has contact with the cover 50 but is not fixed thereto. The cover 50 includes a cover body part 52 and an adherend fixing part 56.

The cover body part 52 is a part covering the wiring member 20. The cover body part 52 covers the wire-like transmission member 26 and the sheet 22. Herein, the cover body part 52 has contact with at least some wire-like transmission member 26. The plurality of wire-like transmission members 26 include a wire-like transmission member having a large diameter and a wire-like transmission member having a small diameter. The cover body part 52 has contact with at least the wire-like transmission members 26 having the larger diameter. Herein, the plurality of wire-like transmission members 26 having the small diameter are provided. The cover body part 52 has contact with some wire-like transmission member 26 having the small diameter and does not have contact with the other some wire-like transmission member 26 having the small diameter. The wire-like transmission member 26 and the cover body part 52 are not fixed to each other in a part where they have contact with each other.

The adherend fixing part 56 is a part fixed to the adherend 40. The adherend fixing part 56 is located on a lateral side of the cover body part 52. Herein, the adherend fixing part 56 and the attached surface 42 are fixed via the adhesive member 60. Thus, the adherend fixing part 56 is the adherend bonding part 56 herein.

Herein, the attached surface 42 has a flat surface, thus the adherend bonding part 56 and a part of the cover body part 52 covering the wire-like transmission member 26 are away from each other in a thickness direction of the wiring member 20. The part of the cover body part 52 covering the wire-like transmission member 26 protrudes from the attached surface 42 more than the adherend bonding part 56 in the thickness direction of the wiring member 20. Herein, the cover 50 is bended between the adherend bonding part 56 and the part of the cover body part 52 covering the wire-like transmission member 26 and extends in the thickness direction, thereby absorbing the thickness of the wiring member 20. The cover 50 stands upright to be away from the attached surface 42 from the adherend bonding part 56 toward the part of the cover body part 52 covering the wire-like transmission member 26. Herein, a part between the adherend bonding part 56 and the part of the cover body part 52 covering the wire-like transmission member 26 is referred to as an upright part 53.

The upright part 53 covers the side edge portion 25 of the sheet 22. The upright part 53 may or may not have contact with the side edge portion 25 of the sheet 22. When the upright part 53 and the side edge portion 25 of the sheet 22 have contact with each other, the upright part 53 and the side edge portion 25 of the sheet 22 may be or may not be fixed to each other. In the present example, the upright part 53 and the side edge portion 25 of the sheet 22 are not fixed to each other.

Adoptable as a base material constituting the cover 50 is various types of sheet described as the base material constituting the sheet 22, that is to say, a solid sheet, a foam sheet, and a fibrous material sheet, for example. The same type of base material as that constituting the sheet 22 may be used as the base material constituting the cover 50. A type of base material different from that constituting the sheet 22 may be used as the base material constituting the cover 50. The base material constituting the cover 50 may be a sheet excellent in abrasion resistance. For example, a fibrous material sheet used for the second layer 24 of the base material constituting the sheet 22 may be used as the base material constituting the cover 50. For example, the base material constituting the cover 50 may be a solid sheet made of resin such as PP or polyamide (nylon) and having higher rigidity than the fibrous material sheet.

The adhesive member 60 fixes both the sheet 22 and the cover 50 to the adherend 40. Herein, a region where the cover 50 and the adherend 40 are fixed is provided in the same position as a region where the wiring member 20 and the adherend 40 are fixed along the extension direction of the wiring member 20. The adhesive member 60 includes a first bonding part 61 and a second bonding part 62. The first bonding part 61 is a part bonding the sheet 22 and the adherend 40. The second bonding part 62 bonds the cover 50 and the adherend 40. The first bonding part 61 and the second bonding part 62 are parts different from each other in the adhesive member 60. The first bonding part 61 and the second bonding part 62 are sequentially provided along the width direction of the sheet 22. The first bonding part 61 is overlapped with the sheet 22. The second bonding part 62 protrudes to a lateral side of the sheet 22. The second bonding part 62 is overlapped with the adherend bonding part 56.

Herein, a hot-melt adhesive agent is used as the adhesive member 60. The hot-melt adhesive agent is an adhesive agent having higher adhesivity when it is heated and softened than that at normal temperature. However, the adhesive member 60 is not particularly limited as long as it has adhesivity. For example, the adhesive member 60 may be an adhesive agent such as a thermosetting adhesive agent or an ultraviolet curable adhesive agent other than the hot-melt adhesive agent. For example, the adhesive member 60 may be a gluing agent such as a double-sided adhesive tape.

The metal attached surface 42 of the adherend 40 has contact with the hot-melt adhesive agent. The second surface of the sheet 22 and the adherend bonding part 56 of the cover 50 have contact with the hot-melt adhesive agent. Herein, the second surface of the sheet 22 is a surface of a fibrous material sheet. Thus, there may also be a case where a part of the hot-melt adhesive agent seeps into an inner side of the fibrous material sheet. Such a case causes so-called anchor effect, and fixation strength between the hot-melt adhesive agent and the sheet 22 is increased. When the base material constituting the cover 50 is a single body of the fibrous material sheet, a part of the hot-melt adhesive agent seeps into an inner side of the adherend bonding part 56, and may cause the anchor effect.

The hot-melt adhesive agent can be heated using an induction heating apparatus 80 as illustrated in FIG. 3, for example. When high-frequency waves flow in a coil provided to the induction heating apparatus 80, current (eddy current) occurs in a metal member having the attached surface 42 due to change of magnetic force. The metal member having the attached surface 42 is heated by Joule heat due to the eddy current. Then, the hot-melt adhesive agent having contact with the attached surface 42 is heated by thermal transmission from the attached surface 42 and softened, and is bonded to the attached surface of the adherend 40, the second surface of the sheet 22, and the adherend bonding part 56 of the cover 50.

At this time, the adherend bonding part 56 of the cover 50 may be pressed toward the attached surface 42 by the press member 82. Accordingly, fixation strength between the adherend bonding part 56 and the attached surface 42 can be increased. The hot-melt adhesive agent may be heated while the press member 82 and the attached surface 42 sandwich the adherend bonding part 56 and the cover 50 is in a taut state. Accordingly, the cover 50 is easily kept in the taut state after being fixed. The hot-melt adhesive agent may be previously bonded to one of the attached surface 42 of the adherend 40 and the second surface of the sheet 22 before the attached surface 42 and the sheet 22 are fixed and the attached surface 42 and the cover 50 are fixed.

A dimension of a region where the cover 50 and the adherend 40 are fixed via the second bonding part 62 is larger than that of a region of the side edge portion 25 of the sheet 22 where the wire-like transmission member 26 is not disposed in the width direction of the sheet 22. A dimension W1 is the dimension of the region of the side edge portion 25 in the width direction of the sheet 22 in the example illustrated in FIG. 2. The dimension W1 is a dimension between the wire-like transmission member on an outermost side and the side edge portion 25 of the sheet 22 in the width direction of the sheet 22. A dimension W2 is the dimension of the region where the cover 50 and the adherend 40 are fixed via the second bonding part 62 in the width direction of the sheet 22 in the example illustrated in FIG. 2. The dimension W2 is a dimension of a part of the cover 50 bonded to the adhesive member 60. As illustrated in FIG. 2, the dimension W2 is larger than the dimension W1. Fixation strength normally increases as a bonding area of the cover 50 bonded to the adhesive member 60 gets larger. It is preferable that there is a margin for fixation for the dimension W2 in the fixation of the cover 50, and the margin for fixation for the dimension W2 is not provided to the sheet 22 but is provided to a side of the adherend 40. Accordingly, the margin for fixation for the dimension W2 needs not be provided to the sheet 22, and the sheet 22 can be made to be small.

The cover 50 has contact with the wire-like transmission member 26 and is fixed thereto in a taut state along the width direction of the sheet 22. Accordingly, the cover 50 presses the wire-like transmission member 26 toward the adherend 40. Tensile stress along the width direction of the sheet 22 is applied to the cover 50. Force against the tensile stress is applied to the cover 50 from the second bonding part 62. In a part where the cover 50 and the wire-like transmission member 26 have contact with each other, the wire-like transmission member 26 presses the cover 50 in a direction in which the cover 50 is separated from the adherend 40, and force is applied to the wire-like transmission member 26 as reaction force so that the wire-like transmission member 26 is directed toward the adherend 40.

More specifically, as illustrated in FIG. 3, the cover 50 which has not been fixed to the adherend 40 is flatter than the cover 50 fixed to the adherend 40. When both side edge portions of the cover 50 are fixed to the adherend 40, the cover 50 is bended and deformed so that an intermediate portion of the cover 50 absorbs the thickness of the wiring member 20. At this time, the cover 50 is deformed so that tensile stress along the width direction of the sheet 22 remains in the cover 50. Then, kept is a state where the tensile strength is applied to the cover 50, which is in the deformed state, along the width direction of the sheet 22 while both side edge portions of the cover 50 are fixed to the adherend 40 via the second bonding part 62. Force against the tensile stress is applied to the cover 50 from the second bonding part 62. The second bonding part 62 also has fixation strength for supporting the tensile stress of the cover 50 (mainly, tensile shear bond strength).

When the cover 50 is in the taut state, suppressed is a state where a body of the cover 50 is bowed downward and separated from the wiring member 20 even in a posture where the cover body part 52 does not cover the wire-like transmission member 26 from vertically an upper side. Assumed as the posture where the cover body part 52 does not cover the wire-like transmission member 26 from vertically the upper side is a posture where the wire-like transmission members 26 are arranged in a vertical direction (posture where a right-left direction in FIG. 2 is the vertical direction) or a posture where the wire-like transmission member 26 is located closer to vertically the upper side in relation to the cover 50 (posture where a lower side of FIG. 2 is vertically the upper side and an upper side of FIG. 2 is vertically a lower side), for example.

When the plurality of wire-like transmission members 26 are located, all of the wire-like transmission members 26 need not have contact with the cover 50. It is sufficient that the cover 50 has contact with at least one wire-like transmission member 26 and presses only the wire-like transmission member 26 with which the cover 50 has contact. Herein, the cover 50 has contact with the wire-like transmission member 26 having the large diameter and some wire-like transmission member 26 having the small diameter, and presses theses wire-like transmission members 26.

More specifically, a height of the wiring member, particularly, heights of the plurality of wire-like transmission members 26 are not even in the width direction of the sheet 22 herein. An outer surface of the wire-like transmission member 26 having the large diameter protrudes more than an outer surface of the wire-like transmission member 26 having the small diameter in the thickness direction of the wiring member 20. Thus, a part of the cover body part 52 having contact with the wire-like transmission member 26 having the large diameter protrudes more than the other part in the thickness direction of the wiring member 20. The sheet 22 is in the taut state, thus the cover body part 52 extends straight in a posture of being inclined with respect to the attached surface 42 from a part thereof having contact with the wire-like transmission member 26 having the large diameter toward a lateral side. Then, the cover body part 52 is bended to a side of the adherend 40 toward the adherend bonding part 56 while having contact with the wire-like transmission member 26 having the small diameter in a position of an end portion. The cover 50 has contact with the wire-like transmission member 26 having the large diameter and the wire-like transmission member 26 having the small diameter in the position of the end portion, and does not have contact with the wire-like transmission member 26 having the small diameter therebetween.

The region where the adhesive member 60 is provided in the extension direction of the wiring member 20 can be appropriately set. In the example illustrated in FIG. 1, the adhesive member 60 is provided in the positions of both end portions of the adherend 40 along the extension direction of the wiring member 20. The wiring member 20 is disposed so that the spot fixing part 30 is not overlapped with the adhesive member 60. The adhesive member 60 is located between the spot fixing parts 30. Accordingly, heat of the adhesive member 60 is hardly transmitted to the spot fixing part 30. The wiring member 20 may be disposed so that the spot fixing part 30 is overlapped with the adhesive member 60.

The adhesive member 60 fixing the sheet 22 to the adherend 40 and the adhesive member 60 fixing the cover 50 to the adherend 40 may be provided separately so as not to have contact with each other. The adhesive member 60 fixing the sheet 22 to the adherend 40 and the adhesive member 60 fixing the cover 50 to the adherend 40 may be different from each other. In this case, the region where the cover 50 and the adherend 40 are fixed may be provided in a position different from the region where sheet 22 and the adherend 40 are fixed along the extension direction of the wiring member 20. The region where the cover 50 and the adherend 40 are fixed may be larger or smaller than the region where sheet 22 and the adherend 40 are fixed along the extension direction of the wiring member 20. For example, in the example illustrated in FIG. 1, the adhesive member 60 is provided in two points of both end portions of the adherend 40 along the extension direction of the wiring member 20. The cover 50 and the adherend 40 may be fixed via the adhesive member 60 provided in a different position between these two points.

The cover 50 and the adherend 40 may be fixed via the adhesive member 60 sequentially provided to connect one and the other one of the two adhesive members 60 illustrated in FIG. 1. In this case, the adhesive member 60 may be provided to have a quadrangular frame-like shape in a plan view.

<Effect Etc.>

According to the wiring member-equipped adherend 10 having the above configuration, the cover 50 is fixed to the adherend 40, thus fixation strength required in the cover 50 can be easily ensured, and the region for fixing the cover 50 can be omitted or reduced in the sheet 22. Accordingly, the size of the sheet 22 can be reduced while suppressing reduction of fixation strength of the cover 50.

The dimension of the region where the cover 50 and the adherend 40 are fixed via the second bonding part 62 is larger than that of the region of the side edge portion 25 of the sheet 22 where the wire-like transmission member 26 is not disposed in the width direction of the sheet 22. Accordingly, the region in the cover 50 having the larger dimension than the side edge portion 25 of the sheet 22 is fixed to the adherend 40.

The cover 50 has contact with at least some wire-like transmission member 26 and is fixed thereto in the taut state along the width direction of the sheet 22. Accordingly, the cover 50 can press the wiring member 20 toward the adherend 40.

The cover 50 and the sheet 22 are the different members, and the cover 50 is fixed to the adherend 40 on both sides of the wiring member 20. Accordingly, a base material having physical properties different from that of the base material constituting the sheet 22 can be easily adopted as the base material constituting the cover 50.

Both the first fixing member fixing the sheet 22 to the adherend 40 and the second fixing member fixing the cover 50 to the adherend 40 are the adhesive members 60. Accordingly, the wiring member 20, the adherend 40, and the cover 50 can be simply fixed via the adhesive member 60.

Embodiment 2

Figure 4:
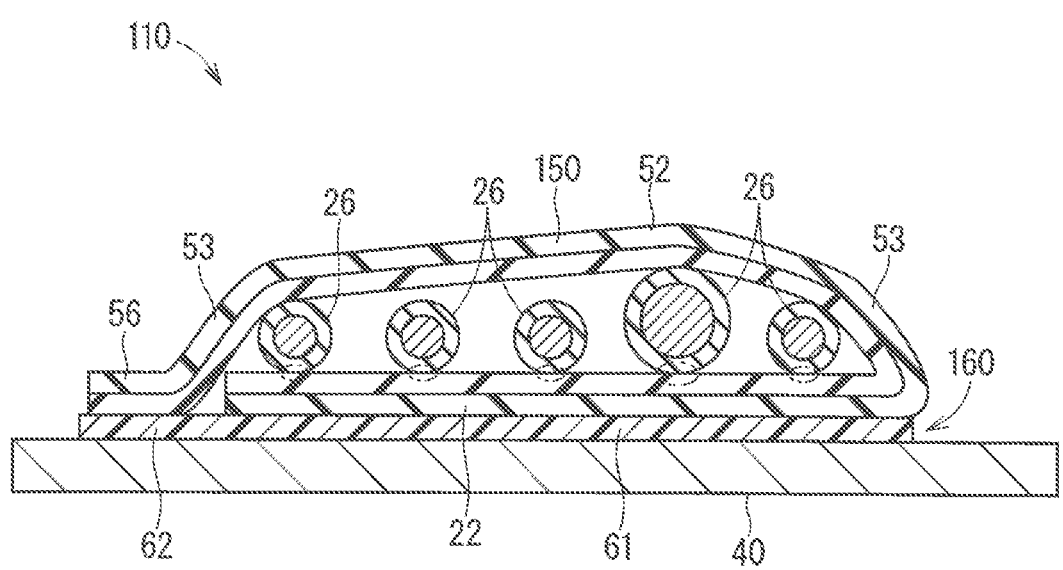
FIG. 4 is a cross-sectional view illustrating a wiring member-equipped adherend according to an embodiment 2.
Figure 5:
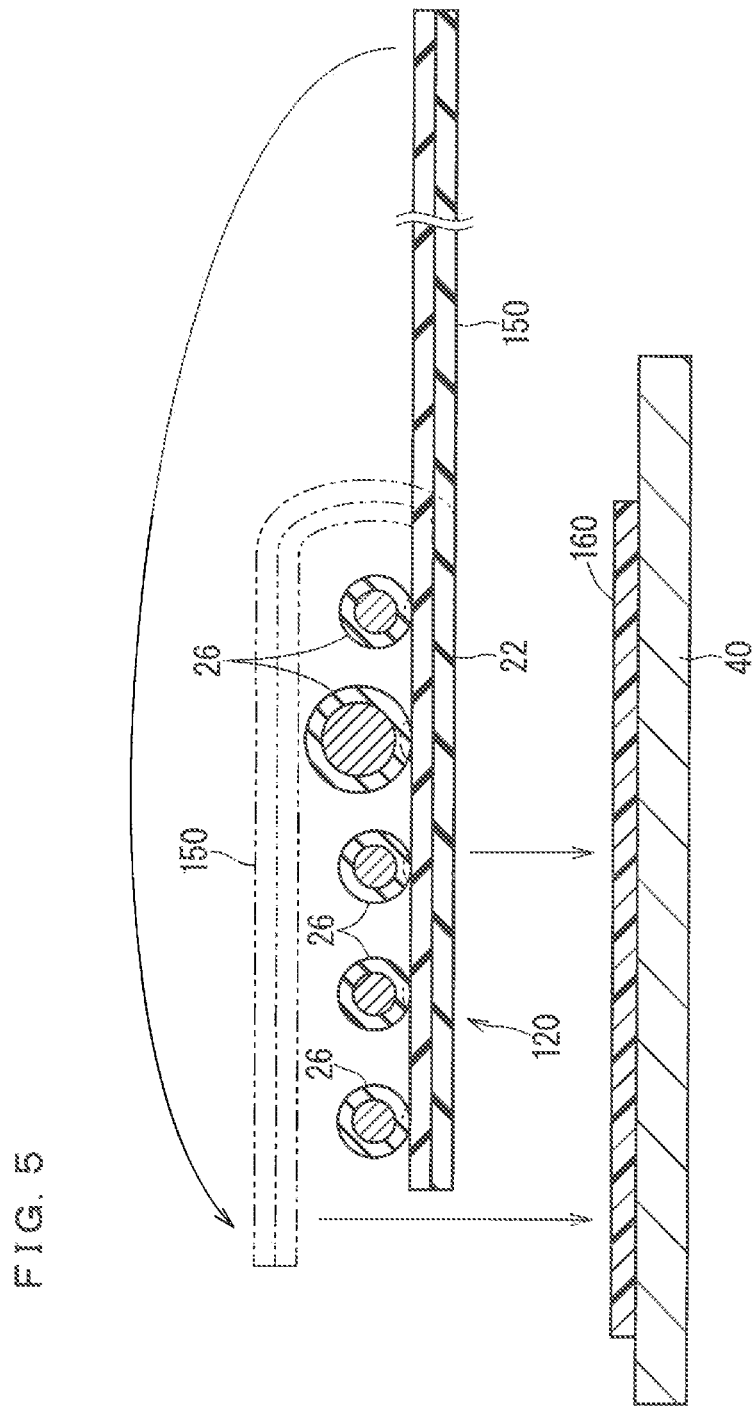
FIG. 5 is an explanation diagram illustrating manufacture of the wiring member-equipped adherend.

A wiring member-equipped adherend according to an embodiment 2 is described. FIG. 4 is a cross-sectional plan view illustrating a wiring member-equipped adherend 110 according to the embodiment 2. FIG. 5 is an explanation diagram illustrating manufacture of the wiring member-equipped adherend 110. In the following description of the present embodiment, the same reference numerals are assigned to the similar constituent elements described above, and the description thereof will be omitted. The same applies to the description of each embodiment and each modification example hereinafter.

The present example is different from the wiring member-equipped adherend 10 described above in that a base material constituting a cover 150 and the base material constituting the sheet 22 are not different base materials but are the same base material. The cover 150 is formed by folding a part of the base material constituting the sheet 22. The cover 150 is fixed to the adherend 40 on only one side of the wiring member 20 (a side on which the sheet 22 and the cover 150 are not connected to each other). The adherend bonding part 56 is provided to only one side of a wiring member 120 in the cover 150. Accordingly, the cover 150 and the adherend 40 need not be fixed on one side (a side on which the sheet 22 and the cover 150 are connected to each other), thus an operation of fixing the cover 150 and the adherend 40 can be easily performed.

A part of the base material serving as the cover 150 is longer than a part thereof serving as the sheet 22 in the width direction of the sheet 22. A width dimension in a region including the part of the base material serving as the sheet 22 and the part thereof serving as the cover 150 is more than twice a width dimension of the part thereof serving as the sheet 22.

The part of the base material serving as the cover 150 may be partially provided along the extension direction of the part thereof serving as the sheet 22. That is to say, when a relationship between the cover 150 and the sheet 22 is the same as that between the cover 50 and the sheet 22 illustrated in FIG. 1, the part partially serving as the cover 150 may be provided to a part corresponding to the region of the cover 50 illustrated in FIG. 1 in the base material. The base material may include a region including only a part serving as the sheet 22 and a region including both a part serving as the sheet 22 and a part serving as the cover 150 along the extension direction. The base material may include a region having a small width dimension and a region having a large width dimension along the extension direction. The region having the small width dimension corresponds to the region including only the part serving as the sheet 22, and the region having the large width dimension corresponds to the region including both the part serving as the sheet 22 and the part serving as the cover 150.

In the example illustrated in FIG. 4, in the base material, the part serving as the cover 150 has the same structure as the part serving as the sheet 22, that is to say, the base material has a double layer structure including the first layer 23 and the second layer 24. The part serving as the cover 150 may have a structure different from the part serving as the sheet 22. For example, also applicable is a structure that the part serving as the sheet 22 includes both the first layer 23 and the second layer 24, and the part serving as the cover 150 does not include the first layer 23 in the first layer 23 and the second layer 24 but is made up of only the second layer 24.

Embodiment 3

Figure 6:
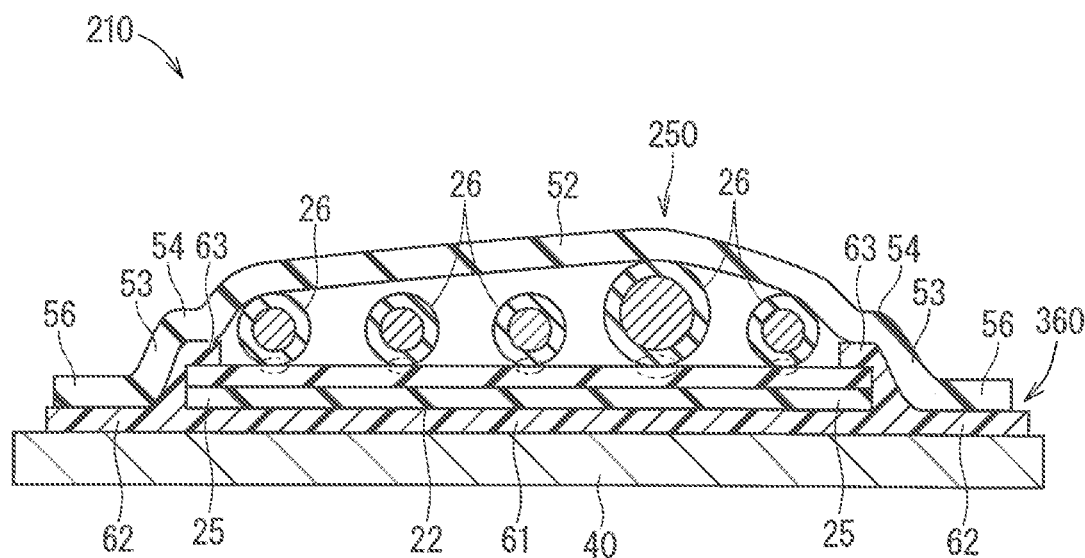
FIG. 6 is a cross-sectional view illustrating a wiring member-equipped adherend according to an embodiment 3.
Figure 7:
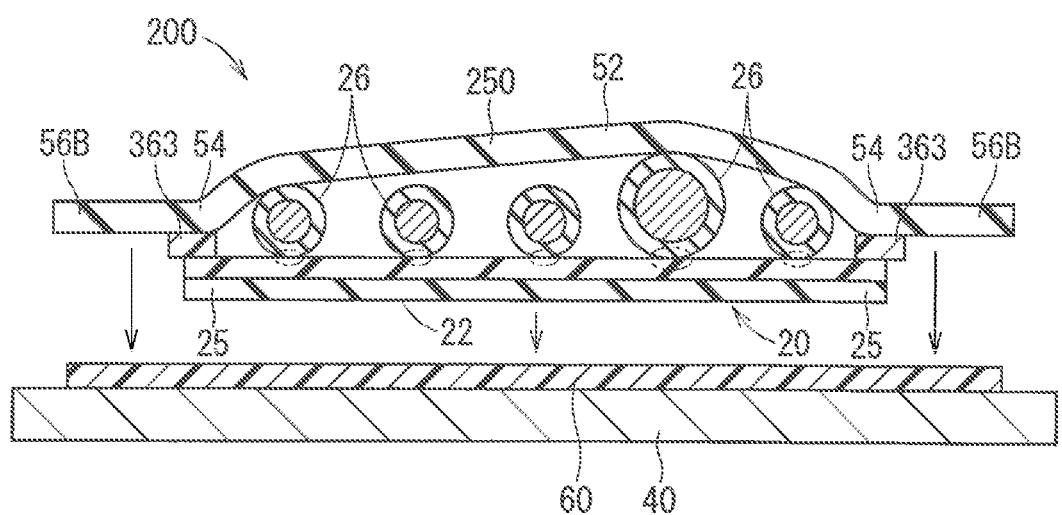
FIG. 7 is an explanation diagram illustrating manufacture of the wiring member-equipped adherend.

A wiring member-equipped adherend according to an embodiment 3 is described. FIG. 6 is a cross-sectional plan view illustrating a wiring member-equipped adherend 210 according to the embodiment 3. FIG. 7 is an explanation diagram illustrating manufacture of the wiring member-equipped adherend 210.

The wiring member-equipped adherend 210 according to the present example is different from the wiring member-equipped adherend 10 described above in that the sheet 22 and a cover 250 are bonded to each other. The cover 250 includes a sheet bonding part 54 and an adherend bonding part 56. The sheet bonding part 54 is a part of the cover 250 overlapped with the side edge portion 25 of the sheet 22. The sheet bonding part 54 is bonded to the side edge portion 25 of the sheet 22. The adherend bonding part 56 protrudes from the sheet bonding part 54 to an outer side of the side edge portion 25 of the sheet 22 along the width direction of the sheet 22. Also in the present example, the adherend bonding part 56 is bonded to the adherend 40 via the second bonding part 62. Accordingly, the cover 250 can be fixed to both the adherend 40 and the sheet 22. The sheet bonding part 54 may be fixed to the whole side edge portion 25 or only a part thereof.

In the present example, the sheet bonding part 54 is bonded to the sheet 22 via an adhesive member 360 bonding the sheet 22 and the cover 250 to the adherend 40. Accordingly, the adhesive member 360 further includes a third bonding part 63 in addition to the first bonding part 61 and the second bonding part 62 described above. The third bonding part 63 bonds the sheet bonding part 54 and the side edge portion 25 of the sheet 22. The sheet bonding part 54 is parallel to the sheet 22. The sheet bonding part 54 may be inclined with respect to the sheet 22.

In the example illustrated in FIG. 6, the dimension of the adherend bonding part 56 is larger than that of the sheet bonding part 54 in the width direction of the sheet 22. However, the dimension of the adherend bonding part 56 may be equal to or smaller than that of the sheet bonding part 54 in the width direction of the sheet 22. A width dimension required for fixing the cover 250 may be provided to the sheet bonding part 54 and the adherend bonding part 56. A width dimension required for fixing the cover 250 may be provided to only the adherend bonding part 56.

The sheet bonding part 54 may be provided before the wiring member 20 is fixed to the adherend 40. That is to say, it is also applicable that the sheet 22 and the cover 250 are fixed via the sheet bonding part 54 in a state before the wiring member 20 is fixed to the adherend 40 to constitute a cover-equipped wiring member 200.

The cover-equipped wiring member 200 includes the wiring member 20 including the sheet 22 and the wire-like transmission member 26 fixed to the sheet 22 and the cover 250 covering the wiring member 20. The cover 250 includes a sheet bonding part 54 and a protrusion part 56B. The sheet bonding part 54 is a part overlapped with the side edge portion 25 of the sheet 22 on at least one side of the wiring member 20. The sheet bonding part 54 is a part bonded to the side edge portion 25 of the sheet 22 via an adhesive member 363. The protrusion part 56B protrudes from the sheet bonding part 54 to an outer side of the side edge portion 25 of the sheet 22 along the width direction of the sheet 22.

According to the cover-equipped wiring member 200, the sheet bonding part 54 is provided, thus the cover 250 can be temporarily held by the wiring member 20. The protrusion part 56B is provided, thus the protrusion part 56B and the adherend 40 are fixed to constitute the adherend bonding part 56. The sheet bonding part 54 in the cover 250 is fixed to the sheet 22, and moreover, the protrusion part 56B is fixed to the adherend 40, thus the size of the sheet 22 can be reduced while suppressing reduction of fixation strength of the cover 250.

The adhesive member 363 protrudes closer to a lateral side in relation to the side edge portion 25 of the sheet 22. The adhesive member 363 may not protrude closer to the lateral side in relation to the side edge portion 25 of the sheet 22. The adhesive member 363 is a part serving as the third bonding part 63 in the wiring member-equipped adherend 210. For example, as illustrated in FIG. 7, the adhesive member 363 is provided separately from the adhesive member 60. The adhesive member 363 may be the same type of adhesive member as the adhesive member 60. The adhesive member 363 may be integrally formed with the adhesive member 60 when the sheet 22 and the adherend bonding part 56 are bonded to the adherend 40 via the adhesive member 60. The adhesive member 363 may be a type of adhesive member different from the adhesive member 60.

It is also applicable that the sheet bonding part 54 is not provided before the wiring member 20 is fixed to the adherend 40 but is provided when the wiring member 20 and the cover 250 are fixed to the adherend 40. For example, as illustrated in FIG. 3, when the wiring member 20 and the cover 50 are fixed to the adherend 40, a part of the adhesive member 60 is pressed by the press member 82 and protrudes more than the first surface of the sheet 22 in the thickness direction of the wiring member 20. In this case, it is also applicable that a part of the protruding adhesive member 60 enters between the first surface of the sheet 22 and the cover 50 and fixes the first surface of the sheet 22 and the cover 50 to constitute the wiring member-equipped adherend 210 illustrated in FIG. 6.

Modification Example

In the above description, the dimension of the region where the cover 50 and the adherend 40 are fixed via the second bonding part 62 is larger than that of the region of the side edge portion 25 of the sheet 22 where the wire-like transmission member 26 is not disposed in the width direction of the sheet 22, however this configuration is not necessary. It is also applicable that the dimension of the region of the side edge portion 25 of the sheet 22 where the wire-like transmission member 26 is not disposed is equal to or larger than the region where the cover 50 and the adherend 40 are fixed via the second bonding part 62 in the width direction of the sheet 22.

In the above description, the cover 50 has contact with the wire-like transmission member 26 and is fixed thereto in the taut state along the width direction of the sheet 22, however, this configuration is not necessary. The cover 50 may not be in the taut state along the width direction of the sheet 22. In this case, the cover 50 may be bowed downward toward the sheet 22 on a lateral side of the wire-like transmission member 26 having the large diameter. The cover 50 may have contact with all the wire-like transmission members 26.

In the above description, both the first fixing member and the second fixing member are the adhesive members 60, however, this configuration is not necessary. One of or both the first fixing member and the second fixing member may be fixing members other than the adhesive member 60. A clamp, for example, may be adopted as the fixing member. In this case, the first fixing member is preferably a member directly fixing only the sheet 22 in the sheet 22 and the cover 50 to the adherend 40. The second fixing member is preferably a member directly fixing only the cover 50 in the sheet 22 and the cover 50 to the adherend 40. It is preferable that the second fixing member does not directly fix the sheet 22 to the adherend 40 but fixes at least a part of the cover 50 which is not overlapped with the sheet 22 to the adherend 40.

The configurations described in the embodiments and modification examples thereof can be appropriately combined as long as they are not contradictory.

EXPLANATION OF REFERENCE SIGNS 10, 110, 210 wiring member-equipped adherend
20, 120 wiring member
22 sheet
23 first layer (fusion layer)
24 second layer (additional layer)
25 side edge portion
26 wire-like transmission member
27 transmission wire body
28 covering layer
30 spot fixing part
40 adherend
42 attached surface
50, 150, 250 cover
52 cover body part
53 upright part
54 sheet bonding part
56 adherend bonding part
56B protrusion part
60, 360, 363 adhesive member
61 first bonding part (first fixing member)
62 second bonding part (second fixing member)
63 third bonding part
200 cover-equipped wiring member

The invention claimed is:

1. A wiring member-equipped adherend, comprising:
a wiring member including a sheet and a wire-like transmission member fixed to a first surface of the sheet;
an adherend provided in a position where the wiring member is disposed in a vehicle and fixed to the sheet via a first bonding part of an adhesive member; and
a cover covering the wire-like transmission member from a side opposite to the sheet, wherein
the cover is fixed to the adherend via a second bonding part of the adhesive member on at least one side of the wiring member, and
at least a portion in a second surface of the sheet opposite to a portion in the first surface where the wire-like transmission member is disposed, is fixed to the first bonding part of the adhesive member.

2. The wiring member-equipped adherend according to claim 1, wherein
a dimension of a region where the cover and the adherend are fixed via the second fixing bonding part is larger than a dimension of a region of a side edge portion of the sheet where the wire-like transmission member is not disposed in a width direction of the sheet.

3. The wiring member-equipped adherend according to claim 1, wherein
the cover is fixed in a taut state along a width direction of the sheet while having contact with the wire-like transmission member.

4. The wiring member-equipped adherend according claim 1, wherein
the cover and the sheet are different members, and
the cover is fixed to the adherend on both sides of the wiring member.

5. The wiring member-equipped adherend according to claim 1, wherein
the wire-like transmission member comprises a plurality of wire-like transmission members arranged in parallel to each other,
a dimension in which the portion in the second surface of the sheet is fixed to the first bonding part of the adhesive member along a parallel direction, in which the plurality of wire-like transmission members are arranged in parallel, is a dimension from one outer side to the other outer side of the plurality of wire-like transmission members in the parallel direction.

6. The wiring member-equipped adherend according to claim 1, wherein
a length of the adhesive member in an extension direction of the wiring member is shorter than a length of the cover in the extension direction, and the adhesive member comprises two adhesive members respectively provided at both end portions of the adherend in the extension direction.

7. The wiring member-equipped adherend according to claim 1, wherein the wire-like transmission member is fixed to the sheet via spot fixing parts provided at intervals along an extension direction of the wire-like transmission member, and the adhesive member is located between the spot fixing parts in the extension direction.

8. The wiring member-equipped adherend according to claim 1, wherein the sheet includes a first layer, which is a solid sheet made of resin, and a second layer which is a fibrous material sheet, and the adhesive member is hot-melt adhesive agent to seep into the fibrous material sheet of the second layer.

\* \* \* \* \*